UNITED STATES PATENT OFFICE.

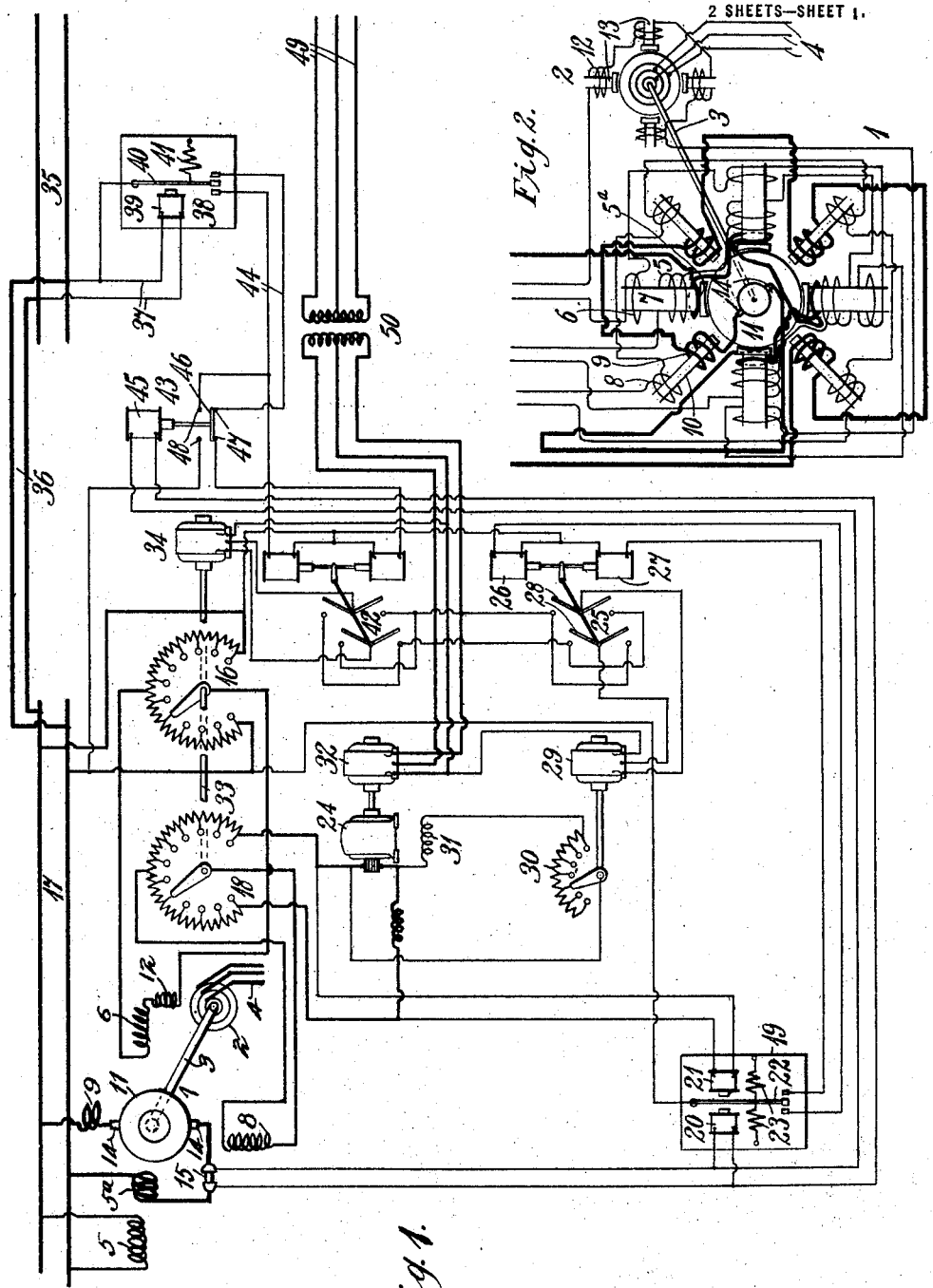

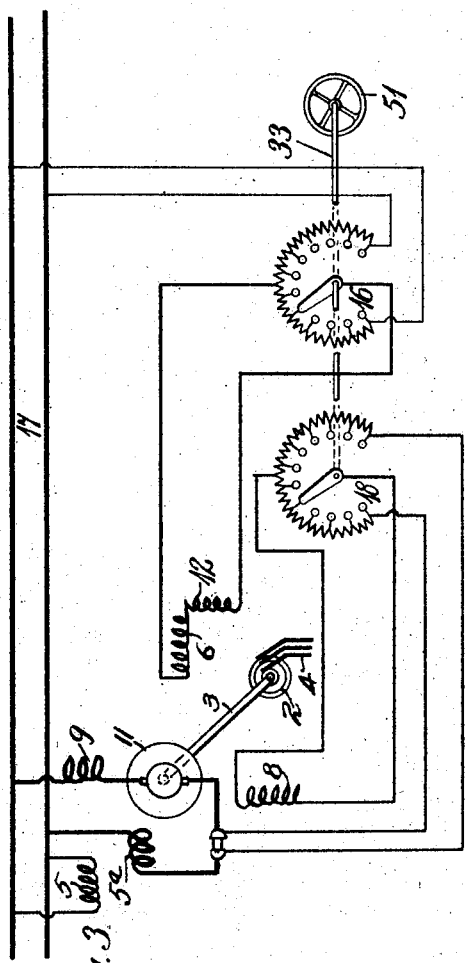

JOHN L. McK. YARDLEY, OF PITTSBURGH, PENNSYLVANIA, ASSIGNOR TO WESTINGHOUSE ELECTRIC AND MANUFACTURING COMPANY, A CORPORATION OF PENNSYLVANIA.

DYNAMO-ELECTRIC MACHINE.

1,392,039.     Specification of Letters Patent.     Patented Sept. 27, 1921.

Application filed April 14, 1913. Serial No. 760,925.

*To all whom it may concern:*

Be it known that I, JOHN L. McK. YARDLEY, a citizen of the United States, and a resident of Pittsburgh, in the county of Allegheny and State of Pennsylvania, have invented a new and useful Improvement in Dynamo-Electric Machines, of which the following is a specification.

My invention relates to dynamo-electric machines and it has special reference to synchronous booster rotary converters and to means for improving the commutating conditions thereof.

The object of my invention is to provide a simple, effective and exact automatic compensating means for securing good commutating conditions in rotary converters under all conditions of load.

By a "synchronous booster rotary converter", I mean a machine combining a rotary converter and a mechanically associated alternating current booster which have their rotor windings connected in series circuit relation. The preferable design disposes both converter and booster on a common shaft. The field frames are cast integrally and the series rotor connections are permanent, there being no slip rings on the converter proper.

The purpose of the combination is to "boost" or "buck" the incoming alternating current voltage for maintaining a predetermined direct current voltage on the converter.

The total armature reaction of a rotary converter, that is, the resultant reaction obtained by integration around the entire armature circumference of the reacting effects of both the alternating and direct currents present during operation in the armature coils, is normally that of a motor, or, in other words, the alternating current reaction predominates. However, if we take simply the commutating zone, that is, the region directly beneath the commutator brushes, which region is, of course, all that we are concerned with when considering commutating conditions, it has been shown mathematically and proved by tests that the normal reaction in this zone is that of a generator, or, to state it differently, the direct current reaction is the greater.

The synchronous booster rotary converter has different electrical characteristics from the simple rotary converter, especially as regards armature reaction. In operating the combined machine, the excitation of the field coils of the booster may be reversed, thereby causing the generated voltage to raise or lower the voltage impressed at the collector rings. When the field is excited so that the voltage generated "bucks" the impressed voltage, the booster acts as a motor, when the field is excited so that the voltage generated "boosts" the impressed voltage, the booster acts as a generator.

In the former case, the rotary converter, being partially driven by the booster, delivers some of its direct current energy as a generator. The additional generative or direct current armature reaction present under the brushes by reason of this generator action of the rotary, is, therefore, additively combined with the generative reaction of the simple converter. On the other hand, in the latter case, where the booster is acting as a generator, being driven by the converter acting partially as a motor, the motor action of the simple converter is correspondingly augmented, and the additional motor or alternating current reaction in the commutating zone, being in opposition to the above-mentioned generative reaction of the simple converter in this zone, is, consequently, subtracted therefrom.

The commutating field strength of the synchronous booster rotary converter must fulfil two requirements if it is to successfully maintain good commutating conditions: first, the field strength must vary with the load current of the converter proper; and second, the field strength must vary according to the additional armature reaction caused by the booster current, which reaction may be either positive or negative, as hereinbefore described.

Heretofore, the first recited requirement has been recognized and satisfied by means of a series commutating field connected to the main line, thus having load current flowing through said field at all times. The second requirement, however, has either not been recognized or has baffled all attempts to properly meet it.

According to my invention, I provide automatic means for successfully fulfilling both prescribed requirements. A series commutating winding is provided for varying the commutating field strength in proportion to the load current, and, as an aid thereto, a commutating series winding is connected in series with a suitable rheostat across a low-resistance shunt in the main line, either directly or secondarily through a relay. For varying said field strength in proportion to the total armature reaction of the converter, the rheostat in the commutating shunt field circuit is mounted on the same shaft as the rheostat in the booster field circuit, thus varying the commutating field strength in proportion to the field strength of the booster. The additional armature reaction hereinbefore considered is proportional to the additional alternating or direct currents flowing in the rotary converter armature upon excitation of the booster, and, consequently, the reaction in question bears a readily determined relation to the field current of the booster. In addition, a main series commutating winding is provided to compensate for the demagnetizing effect of armature reaction, and an auxiliary main shunt field winding is connected in series circuit relation with the booster field winding to compensate for changes in saturation and to improve the power-factor of the machine under all conditions of load.

In the accompanying drawings, Figure 1 is a diagrammatic view of apparatus and electrical connections embodying my invention; Fig. 2 is a diagrammatic view of the field windings and connections of the rotary converter and booster shown in Fig. 1; and Fig. 3 is a view of a modification of my invention wherein apparatus that is adapted for manual operation is substituted for the automatic devices shown in Fig. 1.

Referring to the drawings, a rotary converter 1 is mechanically connected to an alternating current booster 2 by means of a common shaft 3, and the rotor windings (not shown) are electrically connected in series circuit relation. A plurality of conductors 4 serve to connect the booster 2 to an alternating current supply circuit (not shown).

A main shunt field winding 5, an auxiliary shunt field winding 6 and a main series field winding 5ª are wound on main polar projections 7 of the converter 1, and commutating series windings 8 and 9 are disposed on interpolar projections 10. The series winding 9 is connected in series circuit relation with the armature 11 of the converter, thus being traversed by the full line direct current at all times. A main shunt field winding 12, that is disposed on main polar projections 13 of the booster 2, is connected in series with the auxiliary main field winding 6, for the purpose of maintaining a high power-factor on the converter under all conditions of load.

In Fig. 1, the main shunt field winding 5 of the converter 1 is connected across the direct current terminals 14. The commutating series winding 9, the main series field winding 5ª and a shunt 15 are connected in series circuit relation with the armature 11. The auxiliary main field winding 6 and the booster main field winding 12 are connected to a suitable reversing rheostat 16 that is connected across the direct current line 17. The series commutating winding 8 is connected to a suitable reversing rheostat 18 which is connected to any suitable source of direct current and is associated with suitable auxiliary apparatus and circuits, to be described hereafter in detail, by means of which the potential difference across the terminals of the rheostat 18 is varied in accordance with the potential difference across the line shunt 15.

The relay 19 is of the differential type, comprising a plurality of oppositely-disposed magnet coils 20 and 21, and a swinging arm 22, biased by oppositely-disposed balanced springs 23 to the open position, and mounted between them. The operation of the arm 22 is dependent upon the electromagnets 20 and 21, the former being connected across the shunt 15 in the main direct current line, and the latter being connected across an independent direct current generator 24, as hereinafter set forth.

Controlled by the relay 19, is an electromagnetically actuated double-pole reversing switching device 25, which embodies a plurality of solenoids 26 and 27 severally adapted to be oppositely energized through predetermined connections of the swinging arm 22, which thereby completes a circuit across the direct current line 17. Main contact members 28 are thus thrown either in forward or reverse position.

A motor 29, preferably of an alternating current constant speed type, is controlled by the switching device 25. A resistor 30 is adjustably mounted on the shaft of said motor, and the direct current generator 24, preferably of the commutating pole compound type, has a shunt field winding 31 in series with the resistor 30. Another motor 32, similar to the motor 29, is employed to drive the generator 24, across the terminals of which is connected the coil 21 of the differential relay 19, as hereinbefore stated.

The commutating winding 8 of the converter 1 is connected to the reversing rheostat 18, which is also connected in series with the generator 24. The second reversing rheostate 16, in the booster field winding circuit 12, is mounted on a common actuating shaft 33 with the rheostat 18. An automatically controlled motor 34 serves to drive said shaft, as hereinafter described.

Customers' supply buses 35 are severally connected with the sub-station buses 17 by the usual, or any suitable, system of feeder circuits 36. The voltage of the booster 2 and, consequently, the direct current voltage delivered by the converter 1, is secondarily controlled by the voltage at a certain customer's buses 37, in the following manner: A voltage relay 38, comprising a magnet coil 39 which is connected across the buses 37, and a swinging arm 40 biased by a spring 41 and adapted to severally make connections in a plurality of circuits, dependent upon the strength of the electromagnetic force exerted by said coil, and therefore primarily dependent upon the voltage at the buses 37. Controlled by the relay 38, is an electromagnetically-actuated double-pole reversing switching device 42 similar to the device 25 hereinbefore described. The reversing switch 42 controls the operation of the motor 34 which actuates the common shaft 33 of the reversing rheostats 16 and 18, thereby controlling the current in the booster field winding circuit 12 and the commutating series winding circuit 8, and therefore controlling the direct current line voltage.

An overload relay 43, also connected in the voltage relay secondary circuit 44, comprises a solenoid 45 which is connected across the shunt 15 in the main direct current line, and a plunger 46 which is operated by said solenoid and is adapted to make connections in the circuit 44. Normally, said plunger is in its lowest position 47 which permits of connections for throwing the switching device 42 in either direction and thereby operating the motor 34.

If the converter should become overloaded, one remedy resides in lowering the voltage, as is well understood. The overload relay 43 accomplishes the reduction of the voltage, under overload conditions, in a manner described below.

With an unusually heavy line current flowing the voltage drop across the shunt 15 in the main line becomes high enough to energize the solenoid 45 of the overload relay 43 sufficiently to cause said relay to raise the plunger 46 out of the normal position 47, whereby said plunger makes new contact connections 48 that are adapted to throw the switching device in only one direction, viz: The direction which actuates the motor 34, which is controlled by the device 42, to operate the rheostats 16 and 18 to increase the resistance of the field circuits in which they are connected, thereby ultimately reducing the direct current line voltage.

When the auxiliary machine 2 is "boosting" the alternating voltage impressed on the converter, the machine 2 is operating as a generator deriving mechanical power from the converter and increasing the motor reaction of the latter. The reaction of the converter in the commutating zone being normally that of a generator, it will be decreased by the increase in motor reaction and a weaker commutating field is necessary. Under these conditions, the commutating winding 8 opposes the main commutating winding 9.

On the other hand, when the auxiliary machine 2 is "bucking" the alternating voltage impressed on the converter, the machine 2 acts as a motor, driving the converter and increasing the generator reaction of the latter. The reaction is accordingly increased in the commutating zone and this effect is obtained by having the winding 8 assist the winding 9.

The necessary reversal of the direction of current flow in the winding 8 to satisfy both of the above conditions is brought about by energizing the winding 8 from the reversing rheostat 18 which is actuated by the same means as those employed to actuate the rheostat 16 and to cause the machine 2 to act either "boosting" or "bucking."

When the machine 2 is "boosting", the iron of the converter is saturated to a greater degree and a stronger main field is necessary in order to maintain the power factor. Under these conditions, the connections of the auxiliary winding 6 should be such that it is assisting the windings 5 and 5ª.

On the other hand, when the machine 2 is "bucking", the saturation of the iron of the converter is decreased. The strength of the main field and the power factor are maintained at a proper amount under these conditions by having the winding 6 oppose the windings 5 and 5ª.

The connections of the winding 6 are automatically reversed to satisfy all of the above conditions by having it connected in series with the booster field, so that when the latter is reversed to change the action from "bucking" to "boosting", or vice versa, the former will be changed simultaneously.

The several induction motors preferably employed in my invention are adapted for connection to a suitable alternating current supply circuit 49 through a transformer 50.

The operation of the automatic control apparatus hereinbefore described may be stated as follows:

The differentially wound magnet coils 20 and 21 of the differential relay 19 have impressed upon them the voltage across the shunt 15 and the voltage across the terminals of the auxiliary direct current generator 24, respectively. So long as the electromagnetic forces exerted by said coils remain equal in strength, the swinging arm 22 is held by the springs 23 in its "off" position. However, when line load current changes by a predetermined amount, one coil becomes sufficiently energized to overbalance the pull of the other and move the arm 22 into a circuit-completing contact position.

One of the solenoids 26 and 27 embodied in the double-pole switching device 25 is thereby energized, the switch proper 28 is thrown in a predetermined direction, starting the motor 29 that operates the resistor 30 in the field circuit of the direct current generator 24, the voltage of which is accordingly changed, and, by reason of the special design of said generator, the voltage thereof is varied in proportion to the variations of line voltage across the shunt 15. It will be understood that, in case the voltage across said shunt increases, the mechanism is adapted to increase the direct current generator voltage, and, if the shunt voltage decreases, the generator voltage also decreases.

The above process continues until the pulls of the several magnet coils 20 and 21 are again balanced, when the swinging arm 22 of the differential relay 19 drops back to its "off" position, being held by the springs 23. As the commutating shunt field circuit 8 is connected across the direct current generator 24, the current therethrough varies in proportion to the generator voltage, and, consequently in proportion to the direct current in the converter, thus fulfilling one of the two theoretically prescribed requirements for proper adjustment of the commutating field winding strength.

The operation of the voltage relay 38 and apparatus controlled thereby is as follows: The magnet coil 39, connected across a certain customer's busses 37, under normal conditions, holds the swinging arm 40 in its "off" position against the tension of the spring 41. Upon a predetermined change in voltage, however, either the coil 39 or the spring 41 exerts the greater force temporarily, and, consequently, the swinging arm 40 assumes a circuit-completing contact position. One of the plurality of solenoids embodied in the double-pole switching device 42 is thereby energized, the switch proper is thrown in a predetermined direction, starting the motor 34 that drives the shaft 33, upon which are mounted the several reversing rheostats 16 and 18 connected to the communicating series winding 8 and the booster field winding 12, respectively. The resistance in said circuits is thereby simultaneously varied in proportion to the voltage delivered by the booster 2, and, consequently, the current in the commutating winding 8 is varied in like proportion, thereby fulfilling the second theoretical requirement for maintaining proper adjustment of the commutating field winding strength under all conditions of load. It will be understood that the process just described simultaneously and automatically varies the booster field current and armature voltage to maintain a predetermined direct current voltage on the rotary converter.

In the modification of my invention shown in Fig. 3, a manually operated wheel 51 on the shaft 33 is substituted for the motor 34 and related control apparatus. Also, the commutating winding 8 is connected to the rheostat 18 which is connected directly across the line shunt 15, the auxiliary direct current generator 24 and related apparatus being eliminated. The direct current line voltage is thus maintained at the proper value by hand adjustment, whereupon the commutating field strength automatically takes a value such that the best commutating conditions are obtained.

In the accompanying claims, I shall, for the sake of brevity, employ the term "series field" and "shunt field" to denote, respectively, fields in which other things remaining constant, the current varies in some definite ratio with respect to the direct load current delivered by the rotary converter, and fields in which, other things remaining constant, the current varies in some definite ratio with respect to the voltage across some portion of the direct current load circuit. While the ratio in any specific case may be quite difficult to determine, because of the number of elements contributing to it, the said ratio is nevertheless existent and the above assumption is a fair one.

Accordingly, the windings $5^a$ and 9 will obviously be series windings and the winding 5 will obviously be a shunt winding. Since the windings 6 and 12 are connected indirectly across the mains 17, they must be classified as shunt windings, and, since the current in the winding 8 varies in accordance with the current in the shunt 15, it must be classified as a series winding.

I do not wish to be restricted to the specific structures and details herein set forth, but desire that only such limitations shall be imposed as are indicated in the appended claims.

I claim as my invention:

1. The combination with a plurality of dynamo-electric machines mechanically associated and electrically connected in series circuit relation, one of which is of the commutator type, of automatic means mechanically associated with both machines for regulating voltage and securing good commutating conditions on said commutating machine.

2. The combination with a plurality of dynamo-electric machines mechanically associated and electrically connected in series circuit relation, one of which is of the commutator type, of automatic means mechanically associated with both machines for regulating the voltage and securing good commutating conditions on said commutating machine under all conditions of load.

3. The combination with a plurality of dynamo-electric machines mechanically associated and electrically connected in series circuit relation, one of which is of the commutator type, of automatic, load-controlled, electrically actuated apparatus for maintaining a predetermined voltage and securing good commutating conditions on said commutaing machine under all conditions of load.

4. The combination with a plurality of dynamo-electric machines mechanically associated and electrically connected in series circuit relation and provided with field windings, one of said machines being of the commutator type, of automatic, electrically controlled, load-responsive apparatus acting in conjunction with certain of said field windings of both machines for regulating the voltage and securing good commutating conditions on said commutating machine under all conditions of load.

5. The combination with a dynamo-electric machine adapted to deliver alternating and direct currents and provided with a plurality both of main field and of commutating field windings, and a second dynamo-electric machine mechanically associated with said first machine and electrically connected in series therewith and provided with a main field winding, of automatic electrically-controlled means for simultaneously controlling the current in certain of said field windings.

6. The combination with a dynamo-electric machine adapted to deliver alternating and direct currents and provided with a plurality both of main and of auxiliary field windings, and a second dynamo-electric machine mechanically associated with said first machine and electrically connected in series therewith and provided with a field winding, of automatic, electrically controlled, load-compensating means for simultaneously controlling the current in the field winding of said second machine and the current in one of the auxiliary field windings of said first machine.

7. The combination with a dynamo-electric machine adapted to deliver alternating and direct currents and provided with a plurality of main and auxiliary field windings and with commutating windings, and a second dynamo-electric machine mechanically associated with said first machine and electrically connected in series therewith and provided with a field winding, of automatic, electrically controlled, load-compensating means for simultaneously controlling the current in the field winding of said second machine, the current in one of the auxiliary field windings of said first machine, and the current in one of the commutating windings of said first machine.

8. The combination with a rotary converter, a field magnet frame therefor having a plurality of main polar projections and commutating polar projections disposed intermediate thereof, the main projections being provided with a main field winding and the commutating projections being provided with commutating windings, and a booster mechanically associated with said converter and electrically connected in series therewith and provided with a field winding, of automatic, electro-responsive means dependent upon changes in line load conditions for simultaneously controlling the current in the field winding of said booster and the auxiliary shunt field winding of said converter.

9. The combination with a dynamo-electric machine adapted to deliver alternating and direct current and provided with a main field winding and auxiliary and commutating field windings, of a second dynamo-electric machine rigidly associated and electrically connected in series circuit relation therewith and provided with a main field winding, and automatic, load-controlled and electrically actuated apparatus for controlling the currents in said windings in order to maintain a predetermined voltage and to secure good commutating conditions on said first machine under all conditions of load.

10. The combination with a rotary converter provided with a main field winding and auxiliary and commutating field windings, of an alternating current booster rigidly associated and electrically connected in series therewith and provided with a main field winding, and automatic, load-controlled and electrically actuated apparatus for controlling the currents in said windings so as to maintain a predetermined voltage and to secure good commutating conditions on the converter under all conditions of load.

11. The combination with a dynamo-electric machine adapted to deliver alternating and direct currents and provided with a plurality both of main and of commutating field windings, and a second dynamo-electric machine mechanically associated with said first machine and electrically connected in series therewith and provided with a field winding, of automatic, electro-magnetically actuated means dependent upon line load conditions for varying the voltage applied to one of the commutating windings of said first machine, and automatic means for simultaneously controlling the current in certain of said field windings for maintaining a predetermined voltage and securing good commutating conditions on said first machine under all conditions of load.

12. The combination with a dynamo-electric machine adapted to deliver alternating and direct currents and provided with a plurality of main field windings and with a plurality of commutating field windings, and a second dynamo-electric machine mechanically associated with said first machine and electrically connected in series therewith and provided with a field winding, of automatic electromagnetically actuated means controlled by variation of line load conditions for varying the voltage applied to one of the commutating windings of said first machine, and automatic means for simultaneously controlling the current in the field winding of said second machine and the current in one of the shunt field windings of said first machine.

13. The combination with a dynamo-electric machine adapted to deliver alternating and direct currents and provided with a main field winding auxiliary series and shunt field windings, and auxiliary commutating windings, and a second dynamo-electric machine mechanically associated with said first machine and electrically connected in series therewith and provided with a field winding, of automatic, electro-magnetically actuated means controlled by variation of line load conditions for correspondingly varying the voltage applied to an auxiliary commutating winding of said first machine, and automatic means for simultaneously controlling the current in the field winding of said second machine and the current in the auxiliary shunt field winding of said first machine.

14. The combination with a dynamo-electric machine adapted to deliver alternating and direct currents, a field-magnet frame therefor having a plurality of polar projections one portion of which is provided with a main field winding and with an auxiliary field winding and another portion with an auxiliary commutating winding, and a second dynamo-electric machine mechanically associated with said first machine and electrically connected in series therewith and provided with a field winding, of automatic, electro-magnetically actuated mechanism controlled by predetermined variation of line load conditions, an independent source of electrical energy controlled by said mechanism for varying the voltage applied to the auxiliary commutating winding of said first machine proportionately to the variation of line load current, and automatic, electro-magnetically controlled, electrically operated means for simultaneously controlling the current in the field winding of said second machine and the current in the auxiliary shunt field winding of said first machine.

15. The combination with a rotary converter, a field magnet frame therefor having a plurality of main polar projections and intermediate commutating polar projections, the main projections being provided with a main field winding and with an auxiliary field winding and the commutating projections being provided with an auxiliary commutating winding, and a booster mechanically associated with said converter and electrically connected in series therewith and provided with a field winding, of a shunt in series with the main direct current line, automatic, electro-magnetically actuated mechanism selectively controlled by predetermined changes in line load conditions, an independent source of electrical energy, a controlling device therefor electrically actuated by said mechanism for varying the voltage applied to the auxiliary field winding of said converter proportionately to the changes of line load current, and automatic, electro-magnetically controlled electrically operated mechanism for simultaneously controlling the current in the field winding of said booster and the current in the auxiliary field winding of said converter.

16. The combination with a rotary converter, a field-magnet frame therefor having a plurality of main polar projections and commutating polar projections disposed intermediate thereto, the main projections being provided with a main field winding and with an auxiliary field winding and the commutating projections being provided with auxiliary commutating windings, and a booster mechanically associated with said converter and electrically connected in series therewith and provided with a field winding, of a low-resistance shunt in series with the main direct current line, an automatic relay electromagnetically actuated by predetermined variations in voltage drop across said shunt, an adjustable resistor, operating means therefor controlled by said relay, a motor-driven direct-current generator connected across an auxiliary commutating winding of said converter and having its own field winding connected in series-circuit relation with said resistance for varying the generator voltage applied to said auxiliary commutating winding proportionately to the variation of voltage drop across said shunt, a second automatic relay dependent upon variation in line voltage, a switching device operated by said second relay, and power-actuated means controlled by said device for simultaneously controlling the current in the field winding of said booster and the current in the auxiliary field winding of said converter.

17. The combination with a rotary converter, a field magnet frame therefor having a plurality of main polar projections and commutating polar projections disposed intermediate thereto, the main projections being provided with a main field winding and with an auxiliary field winding and the commutating projections being provided with auxiliary commutating windings, and a booster mechanically associated with said converter and electrically connected in series therewith and provided with a field winding, of a low-resistance shunt in series with the main direct current line, an automatic differential relay electromagnetically actuated by predetermined changes in voltage drop across said shunt, an adjustable resistance, power-actuated operating means therefor controlled by said relay, an independently driven direct current generator connected across an auxiliary commutating winding of said converter, also across one element of the differential relay and having its own field winding connected in series circuit relation with said resistor for varying the voltage applied to said auxiliary commutating winding proportionately to the changes in voltage drop across said shunt, an automatic relay operatively dependent upon predetermined variations in line voltage, a switching device operated by said relay and power-actuated means controlled by said device for simultaneously controlling the current in the field winding circuit of said booster and the current in the auxiliary field winding of said converter.

18. The combination with a plurality of dynamo-electric machines mechanically associated and electrically connected in series circuit relation, of automatic means electrically associated with both machines for regulating the voltage and securing good commutating conditions on one of said machines under all conditions of load, and electro-responsive means dependent upon predetermined overload conditions for controlling the line voltage.

19. The combination with a dynamo-electric machine adapted to deliver alternating and direct currents and provided with a plurality both of main and of commutating field windings, and a second dynamo-electric machine mechanically associated with said first machine and electrically connected in series therewith and provided with a field winding, of automatic, electrically-controlled means for simultaneously controlling the current in certain of said windings, and electrically operated means dependent upon predetermined load conditions for lowering the line voltage.

20. The combination with a rotary converter provided with a main field winding and auxiliary field and commutating windings, of an alternating current booster rigidly associated and electrically connected in series therewith and provided with a main field winding, automatic load-controlled and electrically-actuated apparatus for maintaining a predetermined voltage and securing good commutating conditions on the converter, and electrically operated mechanism dependent upon a predetermined increase in line load current for causing a decrease in the booster voltage.

21. The combination with a rotary converter, a field magnet frame therefor having a plurality of main polar projections and commutating polar projections disposed intermediate thereto, the main projections being provided with a main field winding and with an auxiliary field winding and the commutating projections provided with auxiliary commutating windings, and a booster mechanically associated with said converter and electrically connected in series therewith and provided with a field winding, of a low-resistance shunt in series with the main direct current line, an automatic differential relay electro-magnetically actuated by predetermined changes in voltage drop across said shunt, an adjustable resistance member operated by suitable means controlled by said relay, an independently driven direct current generator connected across the auxiliary field winding of said converter, also across one element of the differential relay and having its own field winding connected in series circuit relation with said resistor for varying the generator voltage applied to said auxiliary field winding proportionately to the changes in voltage drop across said shunt, an automatic relay operatively dependent upon predetermined variations in line voltage, a switching device operated by said relay and power-actuated means controlled by said device for simultaneously controlling the current in the field winding of said booster and the current in an auxiliary commutating winding of said converter, and an overload relay dependent upon predetermined increase in line load current for operating said switching device and power-actuated means controlled thereby to cause a decrease in the booster voltage.

22. The combination with a plurality of dynamo-electric machines mechanically associated and electrically connected in series circuit relation, one of which is of the commutator type, of means electrically associated with both machines for regulating the voltage and securing good commutating conditions on said commutating machine, and electrical means for maintaining a high power-factor on said machine, under all conditions of load.

23. The combination with a plurality of dynamo-electric machines mechanically associated and electrically connected in series-circuit relation, one of said machines being of the commutator type and provided with commutating field windings and both of said machines being provided with main field windings, of automatic, electrically controlled apparatus acting in conjunction with certain of said main and commutating field windings for regulating the voltage and securing good commutating conditions on said commutating machine, and connections to certain other of said field windings for regulating the power factor of said commutating machine under all conditions of load.

24. The combination with a rotary converter provided with main series and shunt field windings, an auxiliary main shunt field winding and commutating-series field windings, of an alternating current booster rigidly associated and electrically connected in series therewith and provided with a main field winding, automatic, load-controlled and electrically-actuated apparatus adapted to control the commutating field strength to maintain good commutating conditions on the converter, and a series circuit connection of the auxiliary shunt field of the converter and the booster main field for maintaining a high power-facter on said converter under all conditions of load.

25. The combination with a plurality of dynamo-electric machines mechanically associated and electrically connected in series circuit relation, one of which is of the commutator type, of means mechanically associated with certain parts of both machines for regulating the voltage and securing good commutating conditions on said commutating machine.

26. The combination with a plurality of dynamo-electric machines mechanically associated and electrically connected in series circuit relation and provided with a plurality of field circuits, one of said machines being of the commutator type, of means mechanically associated with said field circuits for regulating voltage and securing good commutating conditions on said commutating machine.

27. The combination with a plurality of dynamo-electric machines mechanically associated and electrically connected in series circuit relation and severally provided with field circuits severally including adjustable resistors, one of said machines being of the commutator type, of means mechanically associated with said resistors for regulating voltage and securing good commutating conditions on said commutating machine.

28. The combination with a plurality of dynamo-electric machines mechanically associated and electrically connected in series-circuit relation, one of said machines being of the commutator type and provided with a commutating field winding and the other of said machines being provided with a main field winding, of a plurality of resistors severally connected to the said field windings, and a common operating device for said resistors for simultaneously regulating voltage and securing good commutating conditions on said commutating machine.

29. The combination with a dynamo-electric machine adapted to deliver alternating and direct current and provided with a plurality both of main and of commutating field windings, and a second dynamo-electric machine mechanically associated with said first machine and electrically connected in series therewith and provided with a field winding, of means dependent upon line load conditions for varying the voltage applied to one of the commutating windings of said first machine, and means for simultaneously varying the current in certain of said field windings for maintaining a predetermined voltage and securing good commutating conditions on said first machine under all conditions of load.

30. The combination with a dynamo-electric machine adapted to deliver alternating and direct current and provided with a main field winding and auxiliary field and commutating windings, and a second dynamo-electric machine mechanically associated with said first machine and electrically connected in series therewith and provided with a field winding, of electrical means dependent upon variation of line load conditions for correspondingly varying the voltage applied to an auxiliary commutating winding of said first machine, and mechanical means for simultaneously varying the current in the field winding of said second machine and the current in the auxiliary field winding of said first machine.

31. The combination with a rotary converter provided with main field windings and auxiliary field and commutating windings, and an alternating current booster mechanically associated with said rotary converter and electrically connected in series therewith and provided with a field winding, said booster and auxiliary field and commutating windings severally including adjustable resistors, of a shunt in series with the main direct current line for varying the voltage applied to an auxiliary commutating winding of said rotary converter proportionately to the changes of line load current, and a common operating shaft for said resistors for simultaneously varying the current in the field winding of said booster and the current in an auxiliary field winding of said rotary converter.

32. The combination with a plurality of dynamo-electric machines mechanically associated and electrically connected in series circuit relation, one of said machines being of the commutator type and provided with field and commutating windings and the other of said machines being provided with field windings, of adjustable resistors, connections from said resistors to said windings, and means mechanically associated with said resistors for operating the same in order to regulate the voltage and to secure good commutating conditions on said commutating machine.

33. The combination with a plurality of dynamo-electric machines mechanically associated and electrically connected in series circuit relation, one of said machines being of the commutator type and provided with field and commutating windings and the other of said machines being provided with field windings, of a plurality of adjustable resistors connected to the said commutating winding and to the said field windings, a common operating device for said resistors, and means for operating said device in order to simultaneously maintain a predetermined voltage and secure good commutating conditions on said commutating machine.

34. The combination with a dynamo-electric machine adapted to deliver alternating and direct currents and provided with a plurality both of main and of commutating field windings, and a second dynamo-electric machine mechanically associated with said first machine and electrically connected in series therewith and provided with a field winding, of means dependent upon line load conditions for varying the voltage applied to one of the commutating windings of said first machine, and means for simultaneously controlling the current in certain of said field windings for maintaining a predetermined voltage and securing good commutating conditions on said first machine under all conditions of load.

35. The combination with a rotary converter provided with main field windings and auxiliary main field and commutating windings, and an alternating-current booster mechanically associated with said rotary converter and electrically connected in series therewith and provided with a field winding, of a plurality of adjustable resistors, said booster and auxiliary field windings being connected to said resistors, a shunt in series with the main direct-current line for varying the voltage applied to the auxiliary commutating winding of said rotary converter proportionately to the changes of line load current, a common drive for said resistors, and means for operating said drive in order to simultaneously vary the current in the field winding of said booster and the current in the auxiliary field circuit of said rotary converter.

36. The combination of an alternating-current booster, a synchronous converter associated therewith and provided with a main field winding, a series commutating field winding and an auxiliary commutating field winding, means for controlling the excitation of the booster field winding, separate means for controlling the excitation of the auxiliary commutating field winding, and means for operating the two controlling means simultaneously.

37. The combination of an alternating-current booster, a synchronous converter associated therewith and provided with a main field winding, a series commutating field winding and an auxiliary commutating field winding, means for simultaneously varying the excitation of the booster field winding and of the auxiliary commutating field winding, and means for adjusting the rate of variation of the excitation of one of said simultaneously varied windings.

38. In combination, a rotary converter having a series commutating field winding and an auxiliary commutating field winding, a booster mechanically connected to said converter having a field winding, means for simultaneously varying and simultaneously reversing the field produced by said auxiliary commutating field winding and the field produced by the field winding of said booster, and means dependent on the load on said converter for further varying the field produced by said auxiliary commutating field winding.

39. In combination, direct current mains, a rotary converter connected thereto having a series commutating field winding and an auxiliary commutating field winding, a booster mechanically connected to said converter having a field winding, means for simultaneously varying and simultaneously reversing the voltage applied to said auxiliary commutating field winding and the voltage applied to the field winding of said booster, and means dependent on the load on said converter for varying the current in said auxiliary commutating field winding.

40. The combination with a rotary converter provided with main and auxiliary cross field windings, of a booster mechanically and electrically associated therewith and provided with a field winding, current-supply connections for all of said field windings, means for adjusting the strength and direction of the exciting current supplied to said booster field winding which simultaneously and similarly affect the current supplied to said auxiliary field winding, and means for varying the current supplied to said auxiliary field winding which do not affect the excitation of said booster field winding.

41. The combination with a rotary converter provided with cross field windings, of a booster electrically associated therewith and provided with field windings, means for exciting said cross field windings in accordance with the direct current of the converter, auxiliary means for adjusting both the strength and direction of the excitation of said booster field windings and for simultaneously and similarly supplying a component of excitation to said cross field windings, and independent means for varying the effect of said auxiliary means upon the excitation of said cross field windings.

42. The method of improving the commutation of a synchronous booster rotary converter of the class described, which consists in maintaining a commutating field having a component proportional to the load current of the converter, in maintaining an additional component of commutating field which varies in direction and magnitude in accordance with the adjustments of the voltage of the booster, and in varying said last mentioned component in accordance with the load current of said converter.

43. The method of improving the commutation of a synchronous booster rotary converter of the class described, which consists in maintaining a commutating field having a component which varies both in accordance with the load current of said converter and in accordance with the booster voltage.

44. The method of improving the commutation of a commutator-type dynamo-electric machine having a variable translating device mechanically connected thereto for interchanging power in either direction therewith, which consists in producing a component of commutating field excitation which varies in direction and magnitude in accordance with said power interchange, and in varying said component in accordance with the load current of said machine.

45. The method of improving the commutation of a commutator-type dynamo-electric machine having a variable translating device mechanically connected thereto for interchanging power in either direction therewith, which consists in producing a component of commutating field excitation which varies in accordance with the load current of said machine, and in producing another component of excitation which varies both in accordance with said load current and in accordance with said power interchange.

In testimony whereof, I have hereunto subscribed my name this 3rd day of April, 1913.

JOHN L. McK. YARDLEY.

Witnesses:
 CARY CARTY,
 B. B. HINES.